United States Patent [19]

Schorre et al.

[11] 4,336,046
[45] Jun. 22, 1982

[54] C4 SEPARATION PROCESS

[75] Inventors: Kenneth R. Schorre, Spring; James O. Nye, Friendswood; Dennie W. Dixon, Bellaire; Carl Nepute, Friendswood, all of Tex.

[73] Assignees: Tenneco Oil Company, Houston; Nye Engineering, Incorporated, Friendswood, both of Tex.

[21] Appl. No.: 186,515

[22] Filed: Sep. 12, 1980

[51] Int. Cl.³ .............................................. F25J 3/02
[52] U.S. Cl. ......................................... 62/28; 62/31; 62/24
[58] Field of Search .................................. 62/24–28, 62/31

[56] References Cited

U.S. PATENT DOCUMENTS

| 1,619,628 | 6/1933 | Falkenberg | 62/24 |
|---|---|---|---|
| 2,619,814 | 12/1952 | Kniel | 62/31 |
| 2,775,103 | 12/1956 | Koble et al. | 62/31 |
| 2,973,628 | 3/1961 | Green et al. | 62/24 |
| 3,100,147 | 8/1963 | Hull | 62/24 |
| 3,390,534 | 7/1968 | Bergo et al. | 62/31 |
| 3,402,124 | 9/1968 | Jones | 62/24 |
| 3,405,530 | 10/1968 | Denahan et al. | 62/28 |
| 3,509,728 | 5/1970 | Mercer et al. | 62/28 |
| 3,681,511 | 6/1971 | Peck | 62/24 |
| 3,827,245 | 8/1974 | Nygaard et al. | 62/18 |
| 3,919,853 | 11/1975 | Rojey | 62/9 |
| 4,002,042 | 1/1977 | Pryor et al. | 62/28 |
| 4,022,597 | 5/1977 | Bacon | 62/28 |
| 4,033,735 | 7/1977 | Swenson | 62/9 |

Primary Examiner—Norman Yudkoff
Attorney, Agent, or Firm—Kenneth H. Johnson

[57] ABSTRACT

Apparatus and process for an energy saving system for the fractionation of a C4 stream containing predominately n-butane and isobutane using an open heat pump cycle in which the n-butane bottoms from the fractionation are the compressing medium and isobutane overhead is used to vaporize the n-butane by indirect heat exchange. A problem which would be expected to prevent this system is the unusual characteristic of n-butane (also isobutane) that on compression a liquid-vapor phase results, which is damaging to the compressor. This is overcome by passing the vaporized n-butane prior to compression, through an apparatus that removes any entrained liquids and heats the vapors to a temperature sufficient to prevent the formation of the liquid phase under compression. It has been found that this process results in the use of only about 9% of the outside energy previously used in conventional operation for a specific unit.

18 Claims, 3 Drawing Figures

C4 SEPARATION PROCESS

BACKGROUND OF THE INVENTION

1. Field of the Invention

The present invention relates to an apparatus and process for the separation of normal butane and isobutane by fractionation. More particularly, the invention relates to the utilization of a heat pump and associated equipment to supply at least a portion of the energy necessary for the fractionation.

2. Prior Art

The use of heat pumps in the treatment of various refinery streams is known, for example heat pumps have been used in specific applications to separate ethane/ethylene and propane/propylene mixtures. Heat pumps have been suggested for open and closed heat pump cycles for low temperature separations of tertiary mixtures. For example, U.S. Pat. No. 3,509,728 discloses the use of an open heat pump cycle wherein components which are separated in the system are employed as refrigerants.

The present invention is directed to the conservation of energy by the use of an open heat pump cycle to supply a portion of the heat to a n-butane/isobutane splitter using n-butane from the splitter as the compression fluid in the heat pump. However, both n-butane and isobutane on compression result in a mixed liquid-vapor phase isentropic mixture. This is unlike ethane and propane or for that matter most hydrocarbons.

The liquid can be very damaging to the compressor and the present invention has overcome this problem and produces an energy savings in the energy otherwise required to operate the splitter.

It is a principal feature of the present invention that existing n-butane and isobutane splitters can be readily adapted to employ the present heat pump cycle either in place of or as a supplement to existing systems of supplying heat to the splitter.

An advantage of the present heat pump cycle is the use of n-butane as the heat pump fluid or medium, since it requires a lower energy input to obtain the same total heat transfer compared to isobutane.

It is an advantage of the present heat pump cycle that it is an open cycle employing therein a material (n-butane) from the system in which it is employed. It is an advantage of the present open heat pump cycle that the energy saving is transmitted to the splitter directly by return of heat pump fluid to the splitter.

It is a feature of the present invention that means have been provided to eliminate the formation of a liquid phase in the butane on compression in the heat pump.

It is a further feature of the present invention that heat is also recovered from the isobutane fraction from the splitter.

It is a particular advantage of the present invention that a substantial energy savings in operation of a C4 splitter is realized. In particular, the present invention provides a means to operate at less than 20% of the outside or incremental energy used to operate the splitter in the conventional manner. These and other advantages and features will become apparent from the following descriptions.

SUMMARY OF THE INVENTION

Briefly, the present invention is in the apparatus and the method of fractionating a mixture containing isobutane and normal butane wherein at least a portion of the energy required for the fractionation is produced by passing superheated normal butane from the fractionation through a heat pump compressor and returning the normal butane to the fractionation as reboil vapors. In particular, a specific piece of apparatus is employed to prevent any liquids from reacting or condensing in the heat pump and to super heat the n-butane prior to compression, since over a period of time the presence of liquids in the vapors being compressed can be very damaging to the compressor. It has been found that normal butane unlike most other gaseous hydrocarbon streams which have been used in heat pump systems, tends to form liquid drops when compressed.

A particular aspect of the present invention is a system in which the heat pump and other sources of energy (heat) are interconnected to be used concurrently with the heat pump or alternatively in the event of the failure of the heat pump.

A very important aspect of the present invention is the apparatus and procedural step of preventing the introduction of liquid, in the form of discreet drops or by compression into the heat pump compressor. The elimination of liquid droplets from the feed to the compressor is obtained in an apparatus, designated as a dry drum. Briefly, the dry drum contains a plurality of metal screens or mesh positioned across the drum, through which vapor must pass, which comprises the mist eliminator section and on which the droplets are removed and coalesced to form larger drops which go to the bottom of the dry drum. A heating means may be provided in the bottom of the dry drum to revaporize the collected drops to vapor and/or the accumulated liquids may be removed. To further insure that the vapors leaving the dry drum will not contain liquid droplets during the compression in the heat pump, a means is provided in the upper section of the dry drum to superheat the vapors. As a part of the system, the means to superheat the vapors in the dry drum may be a heat exchanger (e.g., tubular coil) heated by compressed vapors from the heat pump. Only a small portion of the output of the compressed n-butane vapors are required for this utilization, with the major portion of the n-butane from the heat pump being returned to the fractionation as boil up. Other heat sources may also be used in the dry drum to superheat the n-butane vapors.

It should be appreciated, that withstanding the novel dry drum described hereinabove, the demisting and superheating of the n-butane feed to the compressor, may be carried out in separate apparatus, thus the method steps of demisting and superheating may be separate.

DETAILED DESCRIPTION OF THE INVENTION AND PREFERRED EMBODIMENTS

Figure 1:
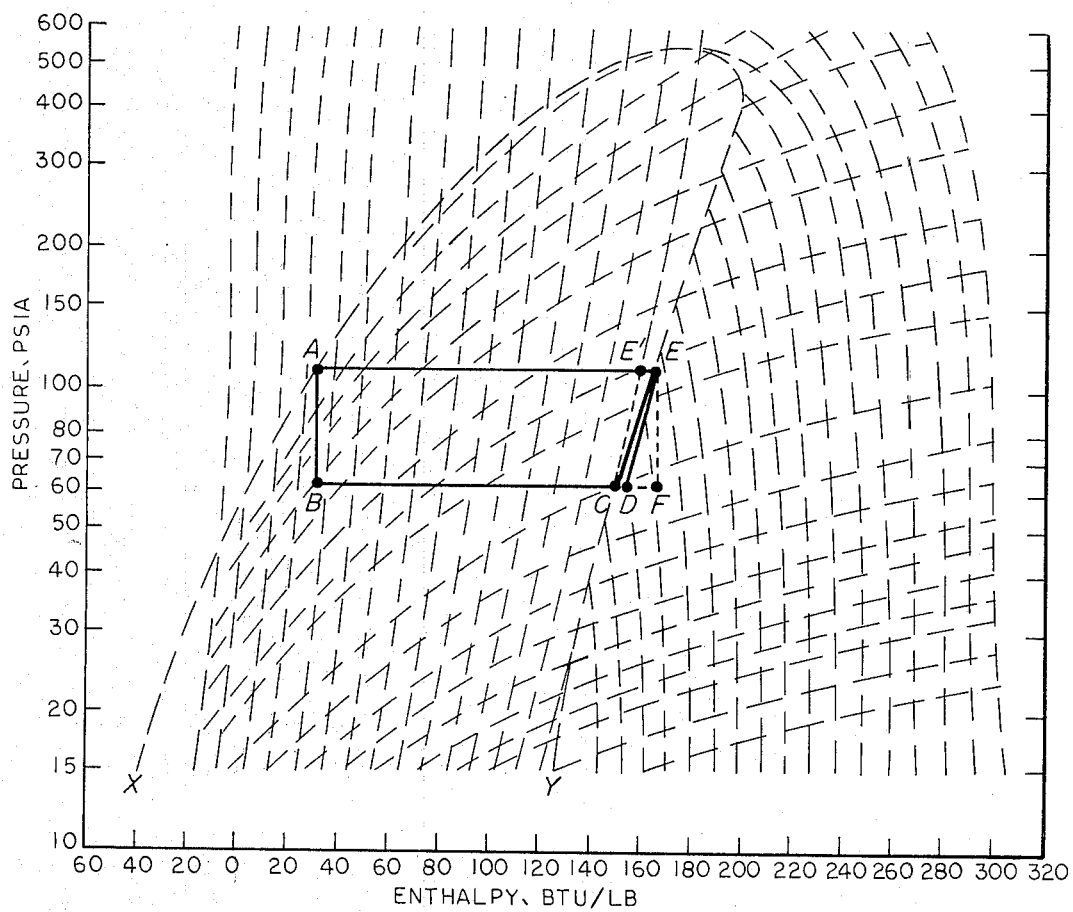
FIG. 1 is a Mollier Chart for n-butane.
Figure 2:
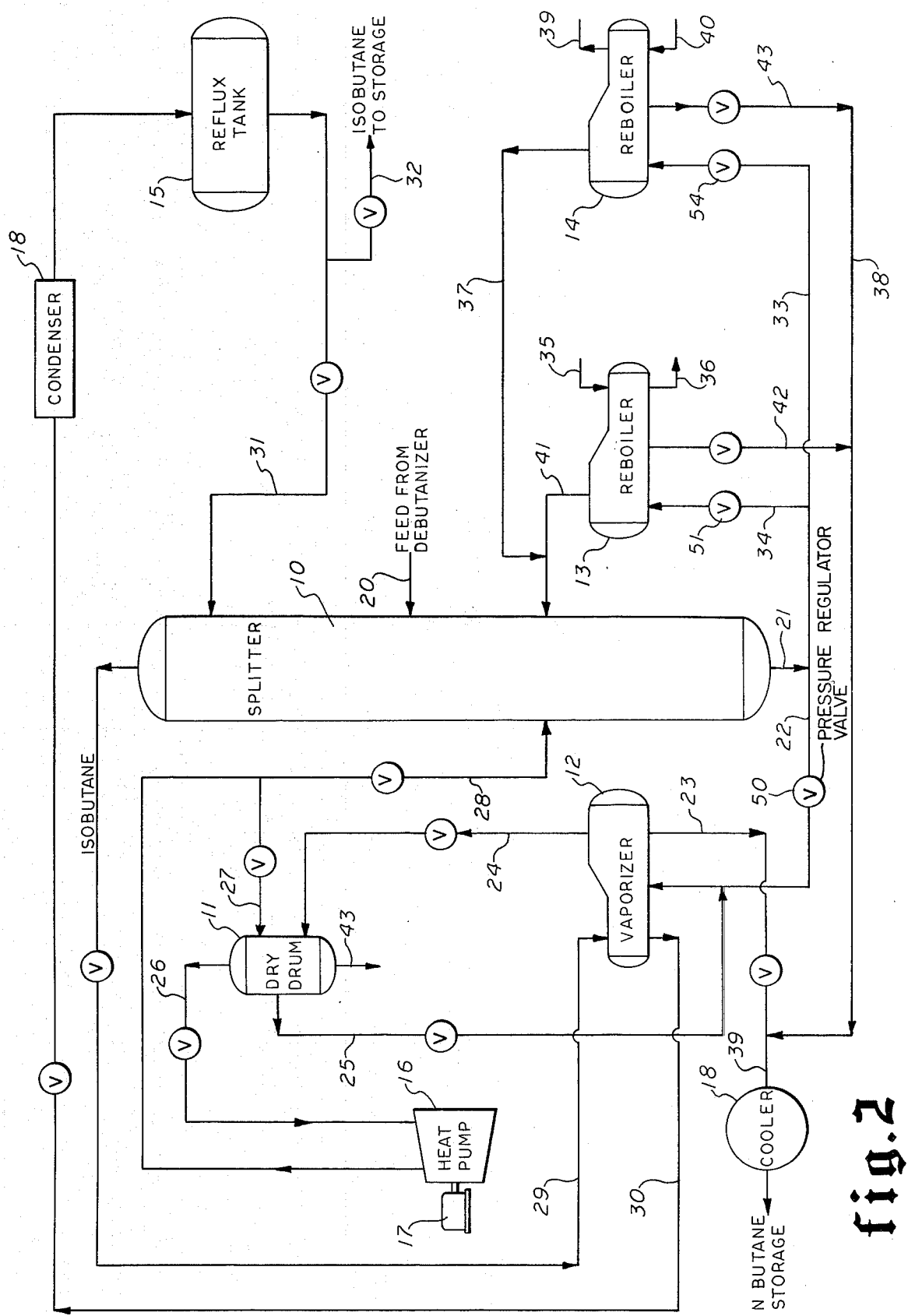
FIG. 2 is a schematic flow diagram of the system combining a heat pump and alternate sources of heat for a fractionation of a mixture of n-butane and isobutane.

The problem presented when using n-butane as the compression medium for a heat pump cycle can be appreciated by reference to FIG. 1, which represents a Mollier Chart for n-butane and FIG. 2, the process flow diagram. Referring to the chart the area under curve X-Y represents liquid-vapor n-butane mixtures. Point A represents the condition of the fluid from splitter 10 via line 21 which is a liquid. Point B represents the condition of the fluid which enters the vaporizer 12 via line 22 which is vapor-liquid mixture. Point C is the condition of fluid leaving vaporizer 12 which is a vapor. Point D represents the fluid coming out of the dry drum 11 which is a super heated vapor. Point E represents the fluid from the compressor (heat pump 16) going to the splitter 10 which is a vapor, according to the present invention.

Point E' approximately represents the fluid from the heat pump 16 is the dry drum 11 and its function were omitted in which case the fluid would be liquid-vapor mixture since the Point E' falls within the curve X-Y.

The dry drum super heats the fluid prior to its entry into the heat pump 16 thereby adding enthalpy to the fluid and taking it outside of the X-Y curve. The amount of heat added to the fluid (n-butane) in the dry drum is that sufficient to maintain the fluid as a vapor without a liquid phase under the conditions of compression by the heat pump. In other words, the operating line for the compressor (heat pump 16) is maintained outside of X-Y curve of the Mollier Chart to avoid the two phase system which would be expected under compression.

The amount of heat added to fluid is at least that which will maintain the fluid as a vapor under the conditions of compression and the upper limit of the amount of heat added is an economic consideration, since adding more heat than would maintain the vapor phase would be detrimental to the energy saving obtained by the overall process employing the heat pump. Hence one of operating skill in the art with the present invention before him would be able to determine for any given stream 24 the amount of superheating required at any pressure and fluid temperature using a Mollier Chart to maintain the operating line C-E for the heat pump outside of curve X-Y.

The present invention stems from the recognition of the problems, i.e., the formation of the two phase system upon compression of n-butane and the solution to that problem as described, since without the super heating of the vapor going to the heat pump, the heat pump would soon become damaged because of the liquid phase present.

The line A-B represents the isentropic expansion of the liquid n-butane stream 22 from the splitter 10. The line B-C represents the heat picked up by the fluid in the vaporizer 12. The line C-D represents the superheat added to the fluid in the dry drum 11. The horizontal component of line D-F represents the heat of compression picked up in the heat pump 16 and the line E-A represents the heat returned to the splitter 10 in the fluid via line 28.

By employing the present invention the fractionation of the $C_4$ stream has been found to use only about 9% of the energy required to operate the fractionation using conventional techniques in the ideal operation according to the present invention. The ideal or optimum operation is obtainable, however, equipment variations or excessive superheating may result is a less benefical result, although at least an 80% savings in incremental energy should be obtainable in all situations.

In FIG. 2 the overall schematic shows a heat pump section (to the left of the drawing) and the more conventional heat supplying components (to the right of the drawing) interconnected for concurrent or alternate use. There are valves indicated in the various lines which allow the partial use of a line or complete shutdown as desired.

The present invention is designated for the separation a $C_4$ stream containing isobutane and normal butane as its principal components. Generally, a feed suitable for this procedure would contain 5 to 95 mole % isobutane, 5 to 95 mole % n-butane, 0 to 20 mole % butenes, 0 to 20 mole % butadiene, 0 to 5 mole % $C_3$'s and lighter, and 0 to 5 mole 5 $C_5$'s and heavier. Preferably, the feed will contain 20 to 80 mole % isobutane and 20 to 80 mole % n-butane with less than 1 to 3 mole % $C_3$'s and 1 to 3 mole % $C_5$'s and heavier.

One source of suitable feed to the splitter 10 is the overheads from a debutanizer. A suitable debutanizer overheads feed for the purpose of illustrating the operation of the process and apparatus is described below.

The feed at about 162° F. from the debutanizer (not shown) enters the splitter 10 (a 66 tray fractioning column) on about the thirty-first tray. The splitter overhead consists of primarily isobutane at about 123° F. and the bottoms are primarily the n-butane at about 149° F.

In one embodiment, the bottoms are fed from the splitter 10 through line 21 and line 22 into vaporizer 12. Valved lines 33 and 34 are shut down, hence the heat pump section is to provide all of the reboil heat. However, by opening valve lines 33 and/or 34 two other heat sources may be employed to supplement or provide a back up for the heat pump section. The conventional heating sections of the system can be used in the start-up until the heat pump section is operable from the fractionated $C_4$ stream.

The $C_4$ stream 20 from a debutanizer feeds into the stripper 10 on the thirty-first tray at 162° F. The overhead is an isobutane stream at 123° F. and 83 psig. The bottoms are n-butane at 149° F. and 91 psig. The bottoms pass to the heat pump system via line 21 and line 22.

The liquid bottoms pass through pressure regulator valve 50 into vaporizer 12 at 108° C. and 43 psig where they are vaporized at least in part. During start-up, additional heat may be supplied by passing a portion of the n-butane bottom through valved lines 33 or 34 into reboilers 13 or 14 which are heated by external sources. A portion of the n-butane may be passed through valved lines 42 and 43 to line 38 and hence through cooler 18 and into storage, the vaporized n-butane may be fed to lines 37 and 41 through lines 37 and 41 to supplement the heat pump system, if desired.

Once the stripper 10 is on stream valves 51 and 54, may be closed or operated as needed to supplement the heat provided from the open heat pump cycle as required or desired. If the heat source for reboiler 13 is waste heat, reboiler 13 wil operate in conjunction with the heat pump system.

Vaporizer 12 is heated by heat exchange by the isobutane overhead through valved line 29. The cooled isobutane passes from vaporizer 12 via line 30 to condenser 18 and hence into reflux tank 15. A portion of the condensed isobutane is returned via valved line 31 to stripper 10 as reflux and another portion passes through valved line 32 to isobutane storage.

The n-butane vapor leaving vaporizer 12 through valved line 24 is at 108° F. and 43 psig. A liquid portion of the n-butane from the vaporizer 12 may be removed via valved line 23 to cooler 18 and hence to n-butane storage.

The line 24 feeds to an apparatus 11 which is designated as a dry drum, which will be described in more detail later. In the dry drum the n-butane is demisted and any liquids removed via line 43 to be used as fuel, or recycled. Also in the dry drum the vaporous n-butane is superheated as described above to maintain the operation line of the heat pump outside of the X-Y curve of Mollier Chart. In this example, about 6° F. is added, i.e., between 2° F. and 20° F., according to other operating perimeters, e.g., the pressure in the compressor of heat pump 16. The stream leaving the dry drum 11 through valved line 26 is at 114° F. and 43 psig. This stream then feeds to the impellers (not shown) of heat pump 16 (operated by motor 17) where it is compressed and returned to stripper 11 via valved line 28 at 91 psig at 149° F. as boil up, below the first tray.

The heat added to the n-butane vapor in the dry drum 11 may be supplied by employing a portion of the compressed vapor from the heat pump 16, through line 27 in a heat exchanger 108 (FIG. 3) and returning the cooled vapors through valved line 25 to line 22 for recycle through the vaporizer 12, however any source of heat may be employed for this purpose.

It can be readily appreciated as to how the conventional means of providing heat to the stripper 10 may be used in conjunction with or to provide a backup to the heat pump cycle.

Figure 3:
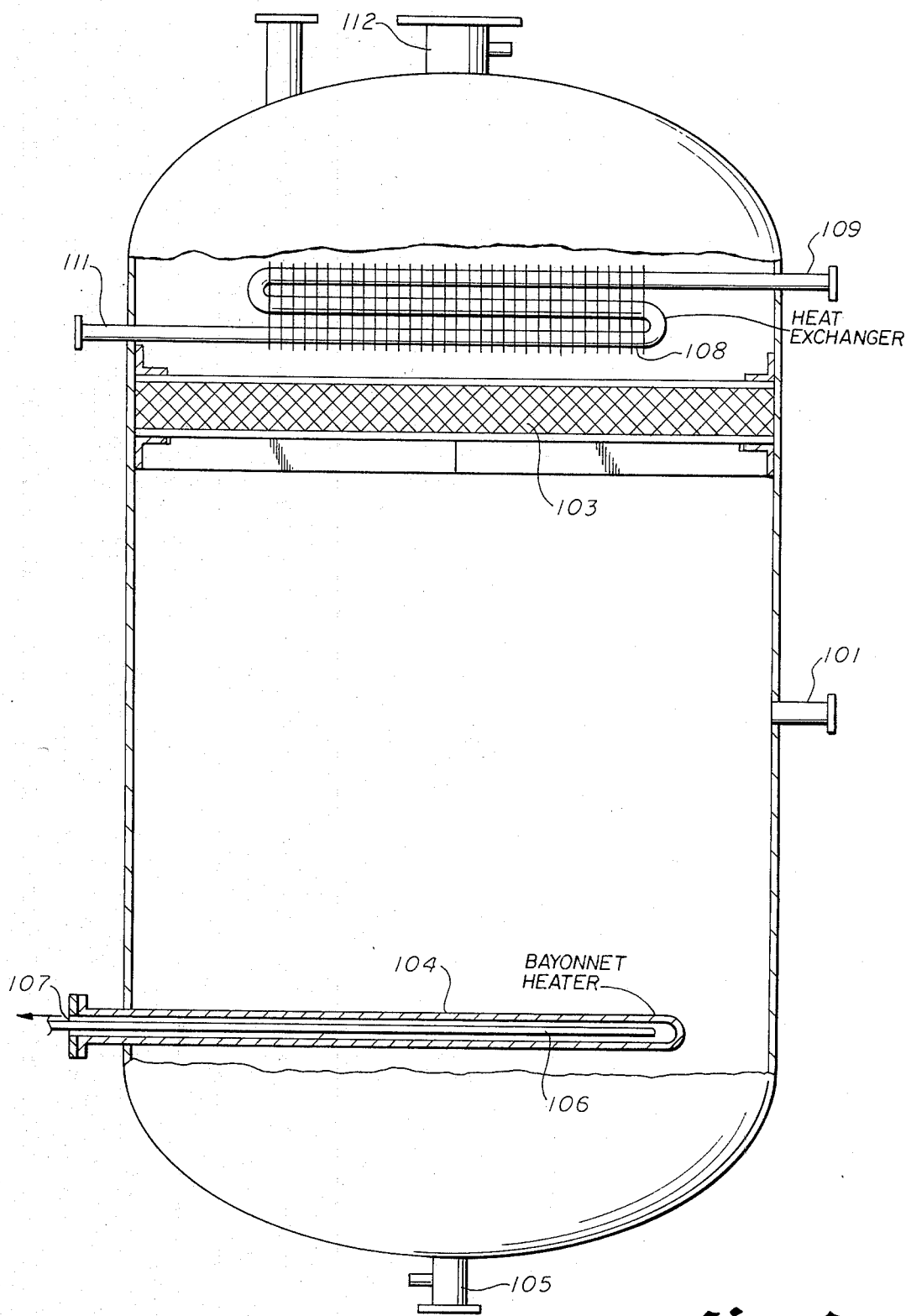
FIG. 3 is an elevational cross sectional view of one embodiment of a dry drum according to the present invention.

FIG. 3 shows a dry drum which is employed to assure only a vaporous single phase of n-butane is fed to the heat pump. There are means provided to coalesce and remove liquid drops, and means to heat the vaporous n-butane. In addition, means are provided to vaporize the liquid coalesced and removed from the n-butane stream.

The dry drum comprises a shell or vessel 110 having a n-butane vapor inlet 101. The vapors pass through demister 103 which comprises a series or plurality of adjacent metal screens or wire mesh where any liquid drops entrained in the vapor are removed and coalesce dropping into the lower part of the dry drum where a heat source, such as the shown bayonnet heater 104 is located, which vaporizes the liquid and returns it as vapor to continue through the cycle. Liquid which is not vaporized may be removed from the dry drum via pipe 105. The bayonnet heated is conventional and is shown here adapted for use with hot oil which circulates in through line 106 and is removed via line 107.

After passing through the demister 103 the n-butane vapors pass through heat exchange coil 108 where they are heated by the incremental amount to maintain the vapor as a vapor during compression in the heat pump as previously described. The heat exchanger 108 may be heated by any means, but it is contemplated, as described above, that a portion of the compress n-butane from the heat pump will be used. The heat medium to the heat exchanger enters at 109 and exits 111. The heated n-butane vapors then pass out of the dry drum through line 112 and into the heat pump where they are compressed as described above.

It should be appreciated the temperatures and pressures employed above are illustrative and other temperatures and pressure may be employed in operating according to the present invention.

In the TABLE a typical operation of the present invention is described by the heat and material balances through the system. The TABLE is based on 100,000 #/hr of mixed C4 feed. Note that reboiler 14 is not employed. A system as described and enumerated in the TABLE uses about 90% less net energy than the same system without the heat pump cycle, since the energy now recovered from the heat pump would normally come for reboiler 14, which is heated with hot oil or steam. The energy required to operate the heat pump 16 is small compared to the energy required to operate the reboiler 14. In the operation described here only 1650 horsepower draw would be required at maximum operation.

TABLE

| Stream Number | | 20 | 29 | 30 | 31 | 32 |
|---|---|---|---|---|---|---|
| Stream Name | | Splitter 10 Feed | Splitter 10 Overheads to Vaporizer 12 | Vaporizer 12 to Condensor 18 | Splitter 10 Reflux | Isobutane Product to Storage |
| State | | Liquid | Vapor | Liquid | Vapor | Liquid | Liquid |
| Temperature, °F. | | 161.9 | 122.8 | 119.9 | 119.9 | 119.9 | 119.9 |
| Pressure, psig | | — | 83.0 | 81.0 | 81.0 | — | — |
| Stream | Density, lbs/cuft | 30.08 | 1.05 | 30.95 | 1.07 | 30.95 | 30.95 |
| Properties | Molecular Weight | 58.0 | 57.9 | 57.9 | 57.9 | 57.9 | 57.9 |
| | BTU Heat Cap, lb-°F. | 0.623 | 0.426 | 0.600 | 0.424 | 0.600 | 0.600 |
| Stream Flows | lbs/hour | 100,000 | 559,538 | 254,131 | 305,406 | 505,807 | 53,730 |
| Total Enthalpy, | MM BTU/hour | −7.32 | 16.01 | −23.94 | 8.74 | −47.67 | −5.06 |
| | Propane | 1.12 | 2.07 | 2.07 | 2.07 | 2.07 | 2.07 |
| Composition, | Iso-Butane | 52.76 | 96.13 | 96.13 | 96.13 | 96.13 | 96.13 |
| mol percent | N-Butane | 46.01 | 1.80 | 1.80 | 1.80 | 1.80 | 1.80 |
| | Iso-Pentane | 0.11 | — | — | — | — | — |
| | N-Pentane | — | — | — | — | — | — |
| | Hexanes plus | — | — | — | — | — | — |

| Stream Number | | 34 | 42 | 41 | 33 | 43 | 37 |
|---|---|---|---|---|---|---|---|
| Stream Name | | Splitter 10 Bottoms Reboiler 13 | N-butane Product Reboiler 13 | Reboil Vapor Reboiler 13 | Splitter 10 Bottoms Reboiler 14 | N-butane Product Reboiler 14 | Reboil Vapor Reboiler 16 |
| State | | Liquid | Liquid | Vapor | Liquid | Liquid | Vapor |
| Temperature, °F. | | 149.8 | 150.2 | 150.2 | 149.8 | 150.2 | 150.2 |
| Pressure, psig | | 89.3 | 89.3 | 89.3 | 89.3 | 89.3 | 89.3 |
| Stream | Density, lbs/cuft | 32.18 | 32.18 | 1.07 | 32.18 | 32.18 | 1.07 |
| | Molecular Weight BTU | 58.2 | 58.2 | 58.2 | 58.2 | 58.2 | 58.2 |

TABLE-continued

| Properties Stream | Heat Cap, lb-°F. | 0.616 | 0.616 | 0.440 | 0.616 | 0.616 | 0.440 |
|---|---|---|---|---|---|---|---|
| Flows | lbs/hour | 258,577 | 21,305 | 237,272 | 0 | 0 | 0 |
| Total Enthalpy, | MM BTU/hour | −22.89 | −2.23 | 9.66 | 0 | 0 | 0 |
| Composition, mol percent | Propane | — | — | — | — | — | — |
| | Iso-Butane | 2.73 | 2.17 | 2.78 | 2.73 | 2.17 | 2.78 |
| | N-Butane | 96.97 | 97.18 | 96.95 | 96.97 | 97.18 | 96.95 |
| | Iso-Pentane | 0.30 | 0.65 | 0.27 | 0.30 | 0.65 | 0.27 |
| | N-Pentane | — | — | — | — | — | — |
| | Hexanes plus | — | — | — | — | — | — |

| Stream Number | | 22 | | 23 | 39 | 24 | 26 |
|---|---|---|---|---|---|---|---|
| Stream Name | | Splitter Bottoms to Vaporizer 12 | | N-butane Product from Vaporizer 12 | N-butane to storage | Reboil to Dry Drum 11 | Dry Drum 11 to Heat Pump 16 |
| State | | Liquid | Vapor | Liquid | Liquid | Vapor | Vapor |
| Temperature, °F. | | 108.0 | 108.0 | 108.0 | 127.0 | 108.0 | 114.0 |
| Pressure, psig | | 43.3 | 43.3 | 95 | 85 | 43.3 | 43.3 |
| Stream | Density, lbs/cuft | 34.57 | 0.63 | 34.57 | 33.70 | 0.63 | .63 |
| Properties | Molecular Weight | 58.2 | 58.2 | 58.2 | 58.2 | 58.2 | 58.2 |
| | BTU Heat Cap, lb-°F. | 0.594 | 0.420 | 0.594 | 0.603 | 0.420 | 0.420 |
| Stream Flows | lbs/hour | 243,813 | 52,825 | 24,965 | 46,216 | 276,990 | 276,990 |
| Total Enthalpy, | MM BTU/hour | −27.92 | 1.61 | −2.86 | −5.09 | 8.66 | 9.35 |
| Composition, mol percent | Propane | — | — | — | — | — | — |
| | Iso-Butane | 2.64 | 2.93 | 2.17 | 2.17 | 2.78 | 2.78 |
| | N-Butane | 96.99 | 96.92 | 97.18 | 97.18 | 96.95 | 96.95 |
| | Iso-Pentane | 0.37 | 0.15 | 0.65 | 0.65 | 0.27 | 0.27 |
| | N-Pentane | — | — | — | — | — | — |
| | Hexanes plus | — | — | — | — | — | — |

| Stream Number | | 28 | 27 | 25 |
|---|---|---|---|---|
| Stream Name | | Heat Pump 16 Discharge to Splitter 10 | Heat Pump 16 to Dry Drum 11 'Superheat' | Dry Drum 11 to Vaporizer 12 |
| State | | Vapor | Vapor | Liquid |
| Temperature, °F. | | 159 | 159 | 150 |
| Pressure, psig | | 91.3 | 91.3 | 91.3 |
| Stream | Density, lbs/cuft | 1.09 | 1.09 | 32.18 |
| Properties | Molecular Weight | 58.2 | 58.2 | 58.2 |
| | BTU Heat Cap, lb-°F. | .445 | .445 | .616 |
| Stream Flows | lbs/hour | 199,994 | 3,513 | 3,513 |
| Total Enthalpy, | MM BTU/hour | 8.83 | .16 | −.36 |
| Composition, mol percent | Propane | — | — | — |
| | Iso-Butane | 2.78 | 2.78 | 2.78 |
| | N-Butane | 96.95 | 96.95 | 96.95 |
| | Iso-Pentane | .27 | .27 | .27 |
| | N-Pentane | | | |
| | Hexanes plus | | | |

The invention claimed is:

1. An apparatus for separating a feed stream containing predominately n-butane and isobutane comprising:
   (a) a fractionator means operably connected to provide a vapor overhead fraction containing substantially isobutane and liquid bottoms fraction containing substantially n-butane,
   (b) vaporizer means operably connected with said fractionation means
     (1) to receive said isobutane overheads, for heating said vaporizer means and
     (2) to receive said n-butane bottoms for vaporizing a portion thereof,
   (c) means operably connected with said vaporizer means to receive said vaporized n-butane from said vaporizer for removing liquid in said n-butane vapor and means, operably connected therewith, for heating said liquid-free n-butane vapor to a temperature at least sufficient to maintain said n-butane vapor in the vapor phase without the formation of a liquid phase in,
   (d) a compressor means operably connected with said means for heating n-butane vapor for compressing said n-butane whereby the temperature of said n-butane vapor is increased to a temperature sufficient to provide boil up in said fractionator means, said compressor being operably connected to said fractionator means for returning said heated and compressed n-butane to said fractionator.

2. The apparatus according to claim 1 having means operably connected to said vaporizer means for condensing said isobutane, means for collecting said condensed isobutane and recovering a portion thereof as product and returning a portion thereof to said fractionation means as reflux.

3. The apparatus according to claim 1 or 2 having means operably connected to said vaporizer for recovering a portion of said liquid n-butane bottoms as product.

4. The apparatus according to claim 3 having a reboiler means operably connected to said fractionation means for supplying additional heat to said fractionator.

5. The apparatus according to claim 1 wherein said means (c) additionally has means for vaporizing said liquid removed from said n-butane vapor.

6. The apparatus according to claim 1 wherein said means to removing liquid in said n-butane vapor and said means for heating said liquid-free n-butane vapor are housed in a single shell in direct fluid communication.

7. A process for fractionating a feed stream containing predominately n-butane and isobutane comprising:
   (a) fractionating said feed stream into a vaporous isobutane overhead and a liquid n-butane bottoms,
   (b) vaporizing a portion of said liquid n-butane by indirect heat exchange with said isobutane vapor,
   (c) removing entrained liquid from said vaporized n-butane,
   (d) heating said liquid free n-butane vapor to at least a temperature sufficient to prevent the formation of a liquid phase therein under compression,
   (e) compressing said heated n-butane vapor to a pressure to raise the temperature thereof to a temperature to provide boil up in said fractionation and
   (f) returning said compressed n-butane vapor to said fractionation as boil up.

8. The process according to claim 7 wherein after said isobutane has vaporized said n-butane liquid, a first portion thereof is recovered as product and a second portion thereof is returned to said fractionation as reflux.

9. The process according to claim 7 or 8 wherein an unvaporized portion of n-butane is recovered as product.

10. The process according to claim 9 wherein boil up in addition to that provided to said compressed n-butane vapor is supplied to said fractionation.

11. The process according to claim 7 wherein said entrained liquid removed from said n-butane vapor is vaporized, said entrained liquid being principally n-butane.

12. The process according to claim 7 wherein in step (d) the amount of heat added to said liquid free n-butane vapor corresponds to line C-D of FIG. 1.

13. An apparatus for separating a feed stream containing predominately n-butane and isobutane comprising:
   (a) fractionator means operably connected to provide a vapor overhead fraction containing substantially isobutane and a liquid bottoms fraction containing substantially n-butane,
   (b) vaporizer means operably connected with said fractionation means
      (1) to receive said isobutane overheads, for heating said vaporizer means and
      (2) to receive said n-butane bottoms for vaporizing a portion thereof,
   (c) means operably connected with said vaporizer means to receive said vaporized n-butane from said vaporizer for removing liquid in said n-butane vapor and means, operably connected therewith, for heating said liquid-free n-butane vapor to a temperature at least sufficient to maintain said n-butane vapor in the vapor phase without the formation of a liquid phase under compression comprising,
      (1) a shell,
      (2) a liquid removing and coelescing means mounted in said shell, whereby vapor passing through said shell must pass through said liquid removing and coelescing means,
      (3) a vapor inlet in said shell on one side of said liquid removing and coelescing means,
      (4) a vapor heating means mounted on said shell on the down stream side of said vapor inlet, said liquid removing and coelescing means being positioned between said vapor inlet and said vapor heating means, and
      (5) a vapor outlet down stream of said vapor heating means connected to
   (d) a compressor means operably connected with said means for heating n-butane vapor for compressing said n-butane vapor whereby the temperature of said n-butane vapor is increased to a temperature sufficient to provide boil up in said fractionator means, said compressor being operably connected to said fractionator means.

14. The apparatus according to claim 13 wherein said (c) means has liquid heating means provided for vaporizing removed and coelesced liquid, said liquid heating means being positioned in said shell up stream of said liquid removing and collecting means, thereby providing that vaporized liquid passes through said liquid removing and coelescing means and said vapor heating means before leaving said apparatus.

15. The apparatus according to claim 13 wherein said liquid removing and coelescing means of (c) (2) comprises a plurality of adjacent metal screens positioned across said shell.

16. The apparatus according to claim 13 wherein said liquid removing and coelescing means of (c) (2) comprises wire mesh.

17. An apparatus for separating a feed stream containing predominately n-butane and isobutane comprising:
   (a) a fractionator having overhead take off line for removing a vaporous substantially isobutane overhead fraction and a bottoms take off line for removing a liquid substantially n-butane bottoms fraction,
   (b) a vaporizer operably connected to said fractionator by said bottoms take off line, to receive said bottoms fraction therein, and to said overhead take off line, whereby said overhead fraction indirectly heats said bottoms fractions in said vaporizer to vaporize a portion of said bottoms fraction, said vaporizer having a vaporized bottoms take off line for removing said vaporized bottoms therefrom and connected by a line to,
   (c) a device for removing and coelescing liquid in said vaporized bottoms and for heating said liquid free vaporized bottoms to a temperature at least sufficient maintain said vaporized bottoms in vapor phase without the formation of a liquid phase under compression and connected by a line for removing said heated, liquid free bottoms fraction to,
   (d) a compressor for compressing said heated, liquid free vaporized bottoms, whereby the temperature of said vaporized bottoms is increased to a temperature sufficient to provide boil up in said fractionator, by returning said compressed vaporized bottoms to said fractionator.

18. A process for fractionating a feed stream containing 5 to 95 mole % isobutane, 5 to 95 mole % n-butane, 0–20 mole % butenes, 0 to 20 mole % butadiene, 0 to 5 mole % $C_3$ and lighter hydrocarbons and 0 to 5 mole % $C_5$ and heavier hydrocarbons comprising:
   (a) fractionating said feed into a vaporous overhead containing substantially all of the isobutane and liquid bottoms fraction containing substantially all of the n-butane in a column, (b) vaporizing a portion of said liquid bottoms fraction in a vaporizer by indirect heat exchange with overhead fraction,
(c) removing entrained liquid from said vaporized bottoms fraction,
(d) heating said liquid free vaporized bottoms fraction to at least a temperature sufficient to prevent the formation of a liquid phase therein under compression,
(e) compressing said heated vaporized bottoms fraction to a pressure to raise the temperature thereof to a temperature to provide boil up in said fractionation and
(f) returning said compressed vaporized bottoms fraction to said fractionation as boil up.

* * * * *